United States Patent [19]
Aldin, Sr.

[11] Patent Number: 5,820,073
[45] Date of Patent: Oct. 13, 1998

[54] HELICOPTER HAVING A BALANCED TORQUE TRANSMISSION AND NO TAIL ROTOR

[76] Inventor: Edward G. Aldin, Sr., 6441 Greenhill Rd., Lumberville, Pa. 18433

[21] Appl. No.: 664,595

[22] Filed: Jun. 17, 1996

[51] Int. Cl.$^6$ .................................................. B64C 27/12
[52] U.S. Cl. ...................................... 244/17.19; 244/17.11
[58] Field of Search ............................... 244/17.19, 17.11, 244/60; 475/107, 104, 339, 340

[56] References Cited

U.S. PATENT DOCUMENTS

| | | | |
|---|---|---|---|
| 2,944,609 | 7/1960 | Sikorsky | 244/17.19 |
| 2,996,269 | 8/1961 | Parry | 244/17.19 |
| 3,240,083 | 3/1966 | Stoddard | 475/94 |
| 3,679,033 | 7/1972 | Wagner . | |
| 3,721,135 | 3/1973 | Kelley | 475/340 |
| 4,534,524 | 8/1985 | Aldrich . | |
| 4,632,337 | 12/1986 | Moore | 244/17.19 |
| 4,783,023 | 11/1988 | Jupe | 244/17.19 |
| 5,271,295 | 12/1993 | Marnot | 244/60 |

*Primary Examiner*—Robert J. Oberleitner
*Assistant Examiner*—Tien Dinh
*Attorney, Agent, or Firm*—Robert M. Sperry

[57] ABSTRACT

An improved helicopter transmission which which has previously been transmitted from the engine to the main rotor comprising a pair of sun gears connected by a plurality of planetary gears which serve to transmit rotational energy from the engine to the main rotor, while completely absorbing the torque developed in doing so.

9 Claims, 2 Drawing Sheets

HELICOPTER HAVING A BALANCED TORQUE TRANSMISSION AND NO TAIL ROTOR

FIELD OF INVENTION

This invention relates to helicopters and is particularly directed to improved helicopter transmissions which eliminate the need for tail rotors.

PRIOR ART

Helicopters have become widely accepted and extremely useful for a variety of functions. However, in connecting the engine to turn the main rotor of the helicopter, torque is created which tends to cause the body of the helicopter to rotate in a direction opposite to that of the main rotor and, unless this torque is overcome, the helicopter will simply spin around in a circle and will be unable to fly. Prior art helicopters have overcome this torque by providing tail rotors which rotate about a horizontal axis and tend to pull the tail of the helicopter in a direction opposing the torque. Thus, the tail rotor enables the body of the helicopter to remain stationary, while the main rotor provides lift which enables the helicopter to fly. Unfortunately, unless the rate of rotation of the tail rotor is precisely and accurately synchronized to that of the main rotor, the tail rotor will fail to balance or offset the main rotor torque and the body of the helicopter will spin, causing the pilot to lose control of the helicopter and crash. Various mechanisms have been proposed heretofore to automatically synchronize the tail rotor speed with that of the main rotor. However, these prior art devices have been highly complex and expensive and have been subject to failure, causing the helicopter to crash and killing the pilot and passengers.

A search in the U.S. Patent Office has revealed the following:

| PATENT NO. | INVENTOR | ISSUED |
| --- | --- | --- |
| 4,302,154 | John C. Mack | Nov. 24, 1981 |
| 4,479,619 | James E. Saunders et al | Oct. 30, 1984 |
| 4,632,337 | Richard E. Moore | Dec. 30, 1986 |
| 4,811,627 | Rene L. Moville | Mar. 14, 1989 |
| 4,948,068 | James Van Horn | Aug. 14, 1990 |
| 8,700928(Brazil) | Sabastiao de Miranda | Feb. 26, 1987 |

Each of these references is subject to the disadvantages discussed above. Thus, none of the prior art helicopters have been entirely satisfactory.

BRIEF SUMMARY AND OBJECTS OF INVENTION

These disadvantages of the prior art are overcome with the present invention and an improved helicopter transmission is provided which is simple and inexpensive to produce and install and which requires no special skill or training on the part of the pilot, yet which completely eliminates or absorbs the torque which has previously been transmitted from the main rotor to the helicopter structure.

These advantages of the present invention are preferably attained by providing an improved helicopter transmission comprising a pair of sun gears connected by a plurality of planetary gears which serve to transmit rotational energy from the engine to the main rotor, while completely absorbing the torque developed in doing so.

Accordingly, it is an object of the present invention to provide an improved helicopter.

Another object of the present invention is to provide an improved transmission for helicopters.

An additional object of the present invention is to provide an improved transmission for connecting the engine to drive the main rotor.

A further object of the present invention is to provide means for absorbing the torque developed in connecting the engine to drive the main rotor.

Another object of the present invention is to provide means for absorbing the torque developed in connecting the engine to the main rotor which means is simple to construct and install.

An additional object of the present invention is to provide means for absorbing the torque developed in connecting the ne to the main rotor which means requies no special training on the part of the pilot.

A further object of the present invention is to provide an improved helicopter transmission which absorbs the torque developed in connecting the engine to drive the main rotor.

Another object of the present invention is to provide an improved helicopter transmission which requires no special skill or training on the part of the pilot.

An additional object of the present invention is to provide an improved helicopter transmission which requires no special skill or training on the part of the pilot, yet which completely eliminates or absorbs the torque developed in connecting the engine to drive the main rotor.

A specific object of the present invention is to provide an improved helicopter transmission which which has previously been transmitted from the engine to the main rotor comprising a pair of sun gears connected by a plurality of planetary gears which serve to transmit rotational energy from the engine to the main rotor, while completely absorbing the torque developed in doing so.

These and other objects and features of the present invention will be apparent from the following detailed description, taken with reference to the figures of the accompanying drawing.

DETAILED DESCRIPTION OF THE INVENTION

Figure 1:
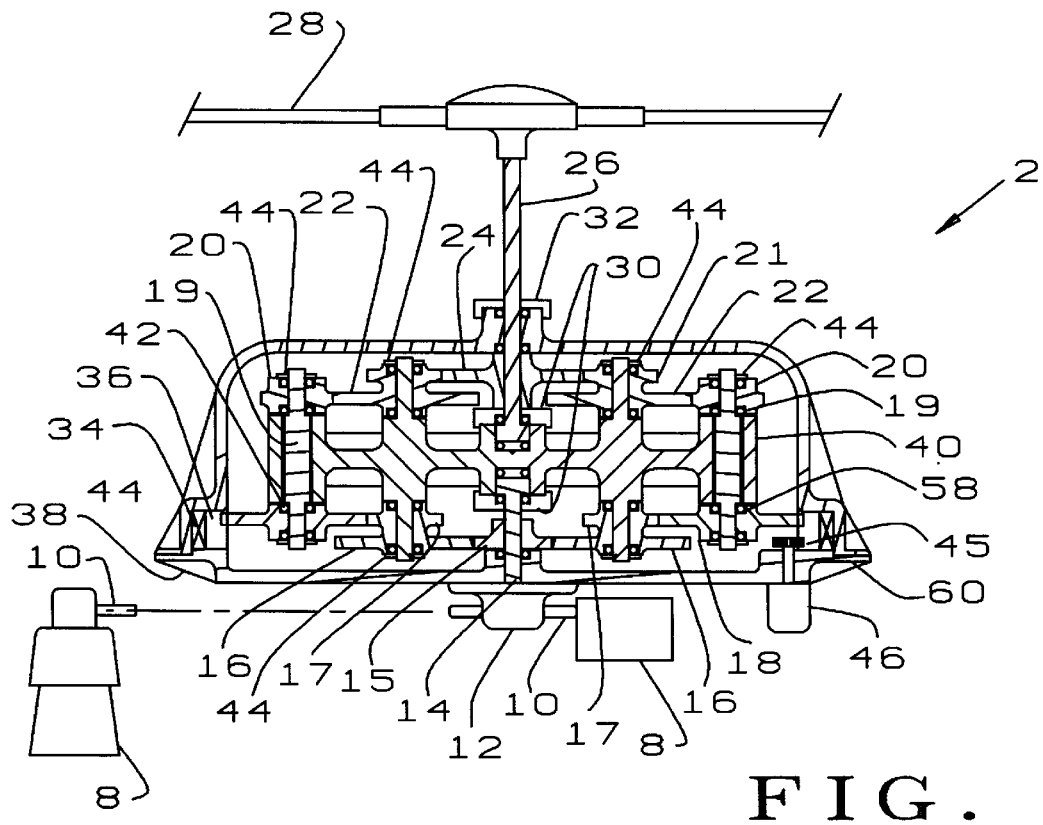
FIG. 1 is an isometric view of a helicopter transmission embodying the present invention.
Figure 2:
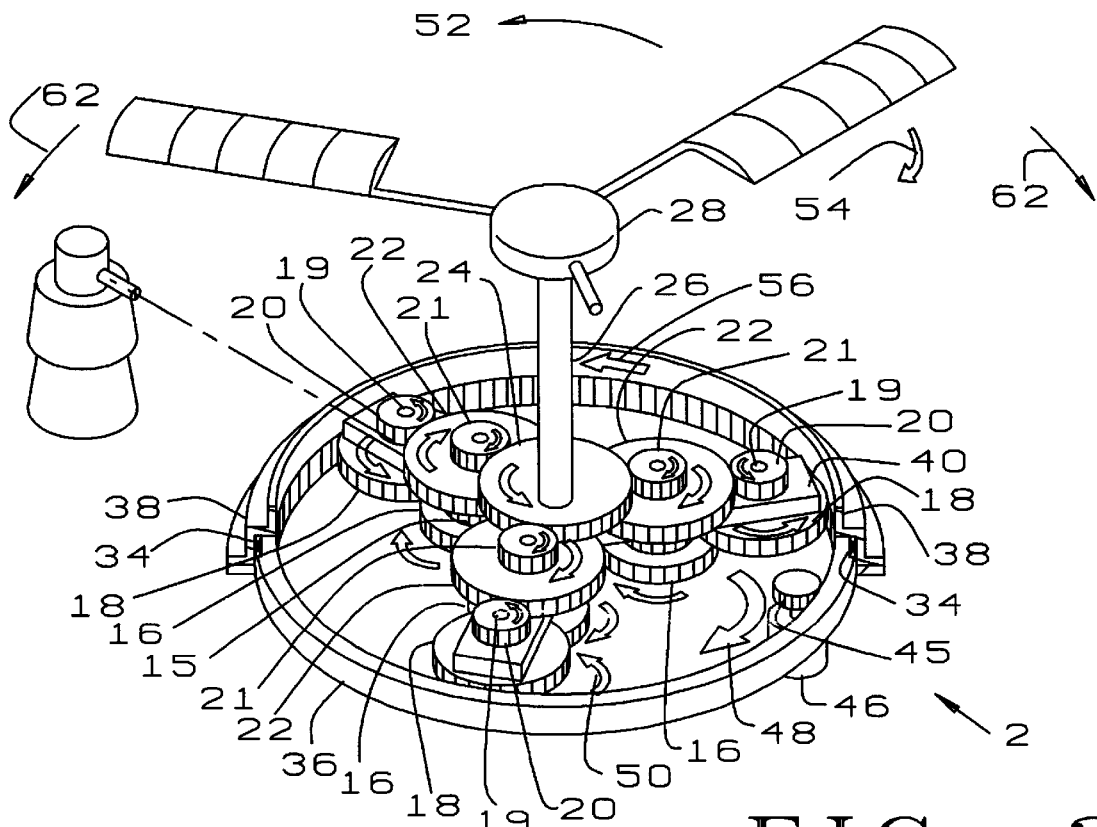
FIG. 2 is a vertical section through a the helicopter transmission of FIG. 1, taken on the line a—a of FIG. 1.
Figure 3:
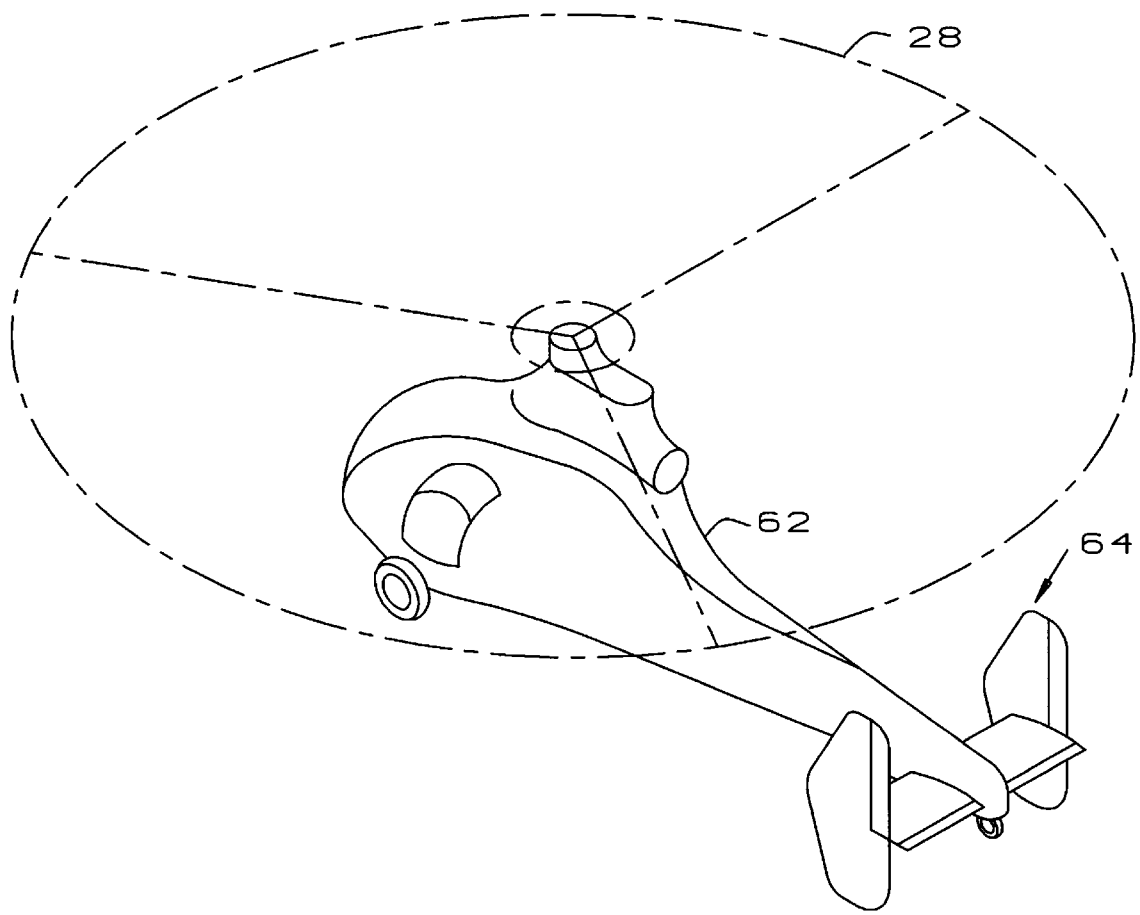
FIG. 3 is an isometric view of a helicopter employing the transmission of FIG. 1.

In that form of the present invention chosen for purposes of illustration in the drawing, FIG. 1 shows a helicopter transmission, indicated generally at 2, having a drive shaft 10, connected to a suitable engine 8 and serving to drive a main rotor 28. The drive shaft 10 is connected through a suitable transmission box 12 to rotate shaft 14 and sun gear 15, which in turn serves to rotate a trio of planetary gears 16. The planetary gears 16 are rotatably mounted on a gear carrier 40, which is a three-legged member having each leg forming an angle of 120° in order to ensure equal and balanced operation of the transmission. The planetary gears 16 each serve to drive a respective secondary gear 17 which, in turn, serves to drive a respective one of the outer planetary gears 18, which are also rotatably mounted on the gear carrier 40 and which act, through shafts 19 to drive upper planetary gears 20. The upper planetary gears 20 each rotates a respective inner gear 22, which is rotatably mounted on gear carrier 40 and which each serve to drive a respective smaller gear 21 which cooperate to drive upper sun gear 24, which, in turn, drives shaft 26 to turn the main rotor 28. Bearing retainers 30, 32 and 44 serve to retain bearings to facilitate rotation of the components. A ring roller bearing 34 is mounted within transmission housing 38 and facilitates rotation of a ring gear 36, which is driven by a drive gear 45 which, in turn, is driven by worm-gear motor 46. Motor 46 is controllable by the pilot to permit controlled rotation of the body of the helicopter. As seen in FIG. 3, the helicopter 62 can be provided with a conventional tail structure, indicated generally at 64, instead of a tail rotor and will be freed from the hazards which are inherent in the use of a tail rotor.

In use, engine 8 acts through drive shaft 10 and gear box 12 to rotate sun gear 15 in a counter-clockwise direction, as viewed looking down the shaft 26 from the main rotor 28. Sun gear 15 serves to rotate planetary gears 16 in a clockwise direction and the planetary gears 16 serve to rotate the outer planetary gears 18 in a counter-clockwise direction. However, since outer planetary gears 18 also engage ring gear 36, they also serve to cause the gear carrier 40 to rotate in a clockwise direction, as indicated by arrow 48 in FIG. 1. The outer planetary gears 18 also act, through shafts 19 to drive upper gears 20 in a counter-clockwise direction and the upper gears 20 cause inner gears 22 and smaller gears 21 to rotate in a clockwise direction, as indicated by the arrows carried by the respective gears. Finally, the smaller gears 21 serve to cause the upper sun gear 24, drive shaft 26 and main rotor 28 to rotate in a counter-clockwise direction, as indicated by arrow 52. The torque caused by rotation of the main rotor 28 is indicated by arrow 54 and acts in a direction opposite to the rotational force indicated by arrow 52. However, the action of the outer planetary gears 18 engaging the ring gear 36 also transmits a balancing force, indicated by arrow 56, which exactly balances and counteracts the torque 54. Moreover, since the balancing force 56 is created by rotation of the gearing which rotates the main rotor 28, the magnitude of the balancing force 56 will inherently vary with the rate of rotation of the gears to always balance and counteract the torque 54, without requiring any special mechanism of skill on the part of the pilot. In maneuvering the helicopter 62, yaw control can be accomplished by controlling the motor 46 and drive gear 45, while vertical and horizontal attitude can be controlled by the rotor blade control rods and swashplates, not shown, as is conventionally done. Alternatively, if desired, the vertical and horizontal surfaces of the tail structure 64 can be provide with movable portions, as is conventional with fixed wing aircraft.

Obviously, numerous variations and modification can be made without departing from the spirit of the present invention. Therefore, it should be clearly understood that the form of the present invention described above and shown in the figures of the accompanying drawing are illustrative only and are not intended to limit the scope of the present invention.

What is claimed is:

1. A helicopter comprising:
a body,
an engine,
a main rotor,
a transmission connecting said engine to drive said main rotor and including a first sun gear, a second sun gear, a plurality of planetary gears interposed between said sun gears, and
a ring gear coupled to said body through a worm-gear motor to said transmission and serving to produce a rotational force equal and opposite to the torque produced by rotation of said main rotor.

2. The helicopter of claim 1 wherein:
said planetary gears are rotatably mounted on a gear carrier which is rotatable by at least some of said planetary gears.

3. The helicopter of claim 2 wherein:
said gear carrier is a three-legged plate with each of the legs forming an angle of 120° with the adjacent legs.

4. The helicopter of claim 1 further comprising:
a worm-gear motor engaging said ring gear, and
means for rotating said worm-gear motor to rotate said ring gear to regulate rotation of the body of said helicopter.

5. A helicopter comprising:
an engine;
a main rotor;
a transmission comprising:
a first sun gear driven by said engine,
a plurality of planetary gears driven by said first sun gear,
a plurality of secondary gears each driven by a respective one of said planetary gears,
a ring gear encircling said planetary gears,
a plurality of outer planetary gears each driven by a respective one of said secondary gears and engaging said ring gear,
a plurality of upper planetary gears each driven by a respective one of said outer planetary gears,
a plurality of inner gears each driven by a respective one of said upper planetary gears,
a second sun gear,
a plurality of smaller gears each driven by a respective one of said inner gears and serving to drive said second sun gear, and
means coupling said second sun gear to rotate said main rotor; and
means coupled to said transmission and serving to produce a rotational force equal and opposite to the torque produced by said main rotor.

6. The helicopter of claim 5 wherein:
all of said gears except said first and second sun gears and said ring gear are rotatably mounted on a gear carrier which is rotatable by said outer planetary gears.

7. In a helicopter having an engine and a main rotor, but having no tail rotor, the improvement consisting of a transmission connecting said engine to drive said rotor, said transmission comprising:
a first sun gear, a second sun gear, a plurality of planetary gears interposed between said sun gears, and
means coupled to said transmission and serving produce a rotational force equal and opposite to the torque produced by rotation of said main rotor.

8. The helicopter of claim 1 wherein:
said helicopter has no tail rotor.

9. The helicopter of claim 5 wherein:
said helicopter has no tail rotor.

* * * * *